(12) United States Patent
Sala

(10) Patent No.: US 10,449,878 B2
(45) Date of Patent: Oct. 22, 2019

(54) SEAT TRIM MANAGEMENT SYSTEM FOR SEAT CUSHION LENGTH ADJUSTMENT

(71) Applicant: GM GLOBAL TECHNOLOGY OPERATIONS LLC, Detroit, MI (US)

(72) Inventor: Dorel M. Sala, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 15/887,097

(22) Filed: Feb. 2, 2018

(65) Prior Publication Data

US 2019/0241103 A1    Aug. 8, 2019

(51) Int. Cl.
*B60N 2/58* (2006.01)
*B60N 2/02* (2006.01)

(52) U.S. Cl.
CPC ......... *B60N 2/5858* (2013.01); *B60N 2/0224* (2013.01); *B60N 2/0284* (2013.01)

(58) Field of Classification Search
None
See application file for complete search history.

(56) References Cited

U.S. PATENT DOCUMENTS

| | | | | |
|---|---|---|---|---|
| 4,773,703 A * | 9/1988 | Krugener | ............. | B60N 2/0284 297/284.1 |
| 6,419,317 B1 * | 7/2002 | Westrich | ............. | B60N 2/0284 297/284.11 |
| 7,669,929 B2 * | 3/2010 | Simon | ............. | B60N 2/0224 297/284.11 |
| 8,011,728 B2 * | 9/2011 | Kohl | ............. | B60N 2/0284 297/284.11 |
| 8,128,167 B2 * | 3/2012 | Zhong | ............. | B60N 2/62 297/284.11 |
| 8,567,842 B2 * | 10/2013 | Line | ............. | B60N 2/062 296/65.01 |
| 8,801,100 B2 * | 8/2014 | Serhan | ............. | A61G 5/1064 297/284.11 |
| 9,016,784 B2 * | 4/2015 | Line | ............. | B60N 2/0284 297/284.11 |
| 9,039,085 B2 * | 5/2015 | Aselage | ............. | B60N 2/0284 297/284.11 |

(Continued)

FOREIGN PATENT DOCUMENTS

| | | | | |
|---|---|---|---|---|
| DE | 10009228 A1 * | 9/2000 | ......... | B60N 2/0284 |
| JP | 06284940 A * | 10/1994 | | |
| WO | WO-2010091662 A1 * | 8/2010 | ......... | B60N 2/0284 |

*Primary Examiner* — David E Allred

(57) ABSTRACT

A seat trim cover management system for seat cushion length adjustment includes a seat cushion base having stationary portion and an adjustable portion wherein the stationary portion and the adjustable portion include a horizontal top surface and a vertical front surface. An adjustment mechanism is in mechanical communication with the stationary portion and the adjustable portion and is configured to manipulate the adjustable portion. A cover material includes a first end attached to the horizontal top surface of the stationary portion or the adjustable portion, and at least one seat cover management system is attached to a second end of the cover material and is configured to maintain tension between the first end and second end of the cover material while the cover material shrouds the gap created between the stationary portion and the adjustable portion when at the extended position.

9 Claims, 3 Drawing Sheets

(56) References Cited

U.S. PATENT DOCUMENTS

| | | | |
|---|---|---|---|
| 9,321,373 B2* | 4/2016 | Sakata | B60N 2/995 |
| 9,616,776 B1* | 4/2017 | Kondrad | B60N 2/0284 |
| 10,300,824 B2* | 5/2019 | Von Ballmoos | B64D 11/0639 |
| 2010/0060058 A1* | 3/2010 | Becker | B60N 2/0284 297/284.11 |
| 2013/0300171 A1* | 11/2013 | Wiegelmann | B60N 2/0284 297/311 |

* cited by examiner

SEAT TRIM MANAGEMENT SYSTEM FOR SEAT CUSHION LENGTH ADJUSTMENT

FIELD

Apparatuses consistent with exemplary embodiments relate to seat cushion length adjustment. More particularly, apparatuses consistent with an exemplary embodiment relate to a seat trim management system for seat cushion length adjustment.

BACKGROUND

The statements in this section merely provide background information related to the present disclosure and may or may not constitute prior art.

A traditional automobile seat includes a generally horizontal seat base and a seatback coupled to the seat base at an obtuse angle for supporting an occupant of the automobile in a seated posture. The occupant of the automobile sits, facing a forward direction, upon a cushion provided to pad the seat base with his feet resting on the floor and his legs extending outward beyond the cushion. The seat can optionally be provided with a mechanism for horizontally adjusting the position of the seat relative to the floor of the automobile, as well as a mechanism for adjusting the angle between the seatback and the seat base.

A tall occupant having long legs will typically adjust the position of the seat toward a rear of the automobile to enlarge the leg room between a front portion of the seat cushion and a forward barrier of the automobile cabin. Doing so allows the tall occupant to extend his legs as much as possible to enhance his comfort while riding in the automobile. By extending his legs, the tall occupant also allows his thighs to rest somewhat flat on the seat cushion, thereby providing support to the tall occupant's thighs. However, the longitudinal length of conventional seat cushions is insufficient to extend beneath the entire length of the tall occupant's thighs, causing them to extend unsupported beyond a front portion of the seat cushion.

Similarly, an automobile seat tailored to provide thigh support to a tall occupant causes discomfort to a short vehicle occupant. In such cases, the longitudinal length of the seat cushion extends too far forward beneath the short occupant's thighs and even beneath the knee of the short occupant. Thus, while seated, the short occupant cannot bend his legs at a suitable angle to allow his feet to rest on the floor of the automobile's cabin. Also, if the short occupant is driving the automobile then the longitudinal length of the seat cushion may make it impossible for the driver to reach the pedals when seated normally. In such case, the driver would be forced to sit at the edge of the seat in order to reach the pedals.

Previous attempts to devise a vehicular seat to accommodate occupants of varying heights have focused on allowing adjustment of the longitudinal length of the seat cushion. To this end, the front portions of said seats have been made adjustable, independent of the remainder of the seat cushion. The occupant can manually adjust the position of the front portion relative to the seat cushion, thereby providing thigh support where needed. However, such a configuration leaves a gap between the adjustable front portion and the rest of the seat cushion, making the occupant uncomfortable while seated in the seat.

Accordingly, there is a need in the art for a vehicular seat having an adjustable thigh support that is easy to use and accommodates occupants of varying heights without leaving a noticeable gap.

SUMMARY

One or more exemplary embodiments address the above issue by providing a seat trim management system for seat cushion length adjustment.

According to an aspect of an exemplary embodiment, a seat trim cover management system for seat cushion length adjustment includes a seat cushion base having stationary portion and an adjustable portion wherein the stationary portion and the adjustable portion include a substantially horizontal top surface and a substantially vertical front surface. Another aspect of the exemplary embodiment includes an adjustment mechanism in mechanical communication with the stationary portion and the adjustable portion configured to move the adjustable portion from a retracted position to an extended position relative to the stationary portion, wherein a gap is created between the stationary portion and the adjustable portion when at the extended position. Still another aspect as according to the exemplary embodiment includes a seat trim cover material having a first end attached to the substantially horizontal top surface of the stationary portion or the adjustable portion. Another aspect of the exemplary embodiment includes at least one seat trim cover management system attached to a second end of the seat trim cover material configured to maintain tension between the first end and second end of the seat trim cover material while the seat trim cover material shrouds the gap created between the stationary portion and the adjustable portion when at the extended position.

And further aspects of the exemplary embodiment wherein the adjustment mechanism is manually operable or electrically operable.

In accordance with other aspects of the exemplary embodiment, wherein the seat trim cover management system comprises a spring roller. Still in accordance with aspects of the exemplary embodiment, wherein the first end of the seat trim cover material is attached to the substantially horizontal surface of the adjustable portion and the spring roller is disposed on the stationary portion. And another aspect of the exemplary embodiment wherein the first end of the seat trim cover material is attached to the substantially horizontal surface of the stationary portion and the spring roller is disposed on the adjustable portion.

Yet further aspects of the exemplary embodiment wherein the seat trim cover management system further comprises a roller bar. And another aspect of the exemplary embodiment wherein the first end of the seat trim cover material is attached to the substantially horizontal surface of the stationary portion, the roller bar is disposed on the adjustable portion, and the spring roller is disposed on the stationary portion wherein the seat trim cover material traverses the roller bar when the adjustment mechanism is manipulated. Still another aspect of the exemplary embodiment wherein the first end of the seat trim cover material is attached to the substantially horizontal surface of the adjustable portion, the roller bar is disposed on the stationary portion, and the spring roller is disposed to the adjustable portion wherein the seat trim cover material traverses the roller bar when the adjustment mechanism is manipulated.

BRIEF DESCRIPTION OF THE DRAWINGS

The present exemplary embodiment will be better understood from the description as set forth hereinafter, with reference to the accompanying drawings, in which.

DETAILED DESCRIPTION OF THE INVENTION

The following description is merely exemplary in nature and is not intended to limit the present disclosure, application, or uses thereof.

Figure 1:
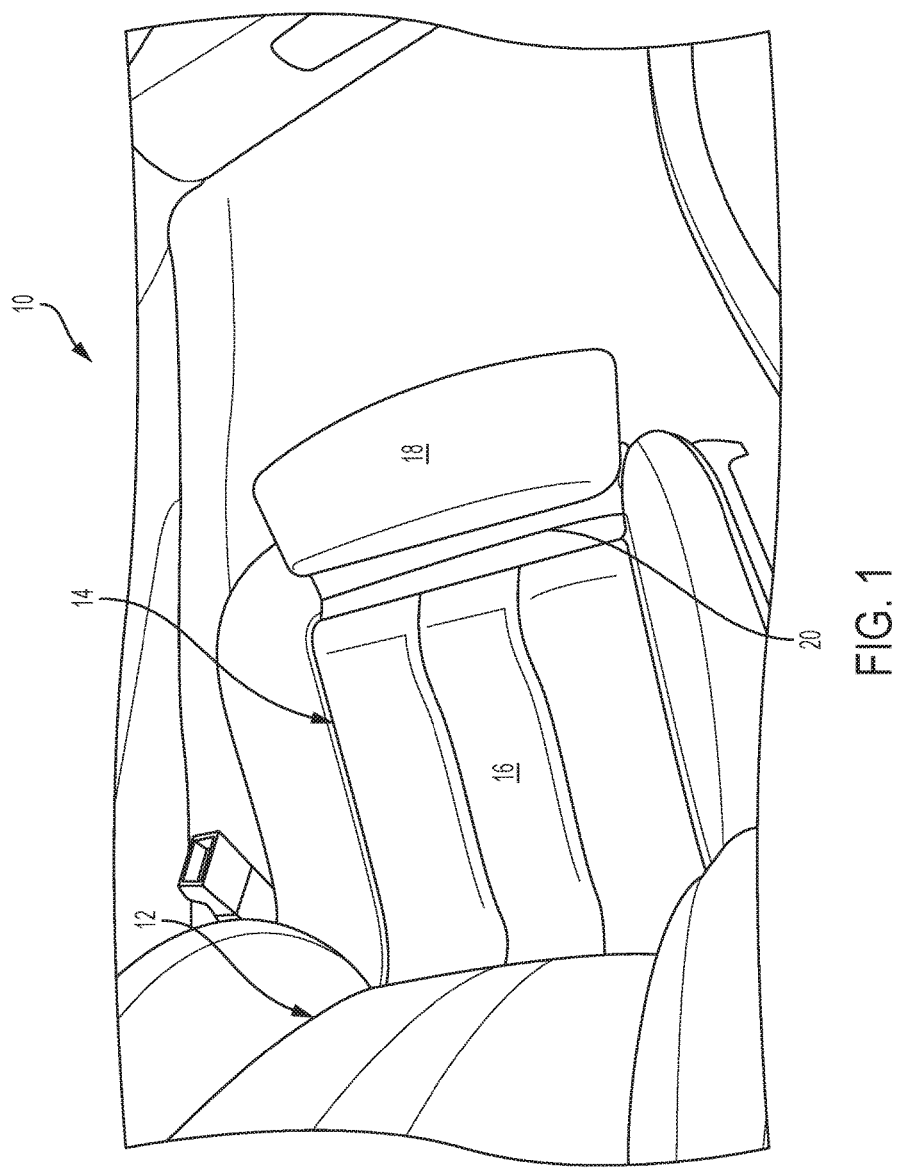
FIG. 1 is an illustration of a seat cushion length adjustment system that leaves a gap when the seat cushion is in an extended position.

FIG. 1 provides an illustration of a seat cushion length adjustment system 10 that leaves a gap 20 when the seat cushion is in an extended position. It is appreciated that any references to the "extended position" throughout this application is intended to include not only a maximum extended position of the adjustable portion but also any of the intermediate positions between fully retracted position and the fully extended position. The vehicle seat includes a seat back substantially vertical portion 12 and a seat cushion base 14. The seat base includes a stationary portion 16 and an adjustable portion 18 that when in the extended position exposes a recessed gap 20 which may make the occupant uncomfortable while seated in the seat and may be esthetically unpleasing. Also, adding the cushion length adjustment (CLA) mechanisms to seats creates the problem of managing the seat cover material during the CLA motion and after the CLA is in extended position. Without proper management, this seat cover material can ultimately become wrinkled and/or scuffed over time.

Figure 2:
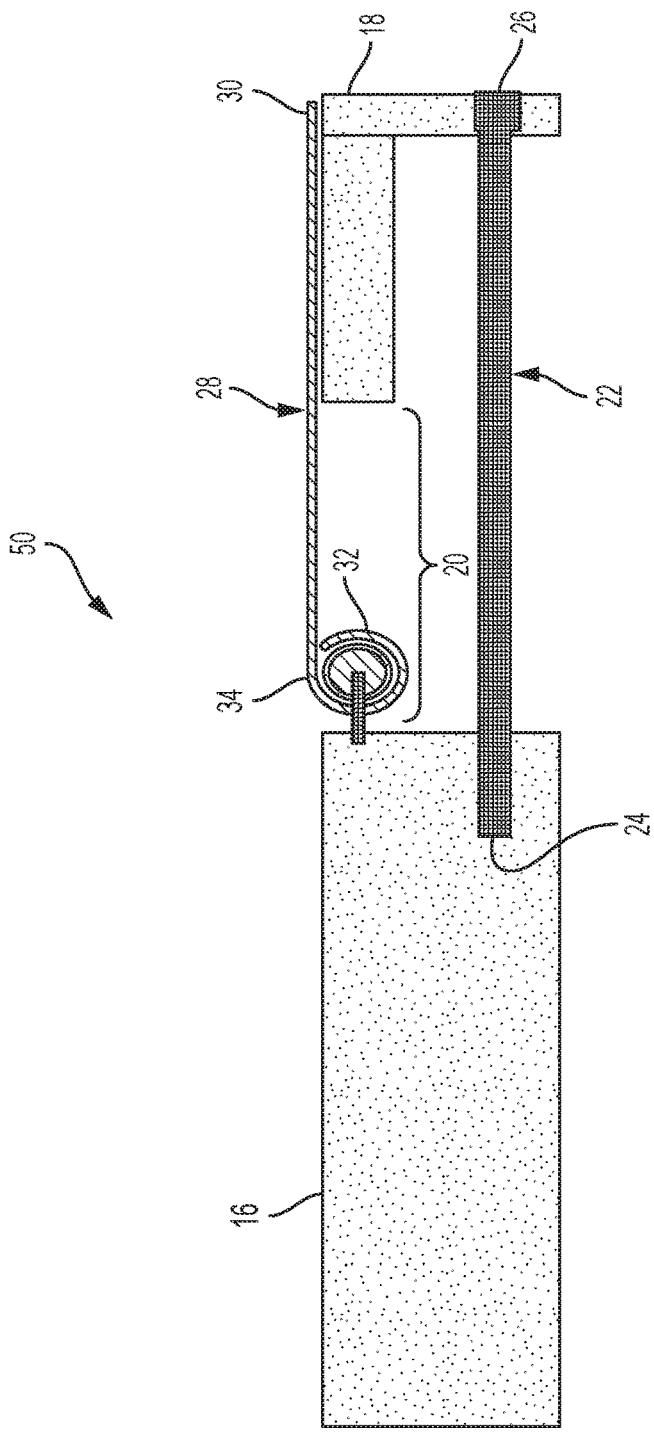
FIG. 2 is an illustration of a seat trim management system for seat cushion length adjustment in accordance with an exemplary embodiment.

Referring now to FIG. 2, an illustration of a seat trim management system 50 for seat cushion length adjustment in accordance with an exemplary embodiment is provided. As mentioned above the seat cushion length adjustment system 50 includes a seat cushion base 14 having a stationary portion 16 and an adjustable portion 18. When the adjustable portion 18 of the seat cushion base 14 is in the extended position a gap 20 is created. An adjustment mechanism 22 is in mechanical communication with the stationary portion 16 at a first end 24, and in mechanical communication with the adjustable portion at a second end 26. The adjustment mechanism 22 can be made manually or electrically operable for moving the adjustable portion 18 between retracted and extended positions.

When in the extended position a seat cover material 28 is provided for substantially shrouding the gap 20 between the stationary portion 16 and the adjustable portion 18. The seat cover material 28 is attached at a first end 30 to a substantially horizontal surface of the adjustable portion 18 and to at least one seat trim cover management system at a second end 32. In accordance with an exemplary embodiment, the seat trim cover management system is a spring roller 34 operable to uncoil the seat cover material 28 under tension when the adjustable portion 18 is moved from a retracted position to an extended position. As such, during and after transition, the seat cover material 28 is elastically rigid while shrouding the gap 20 which gives a sense of support as opposed to a recessed gap region which may be uncomfortable and unesthetically pleasing.

It is appreciated that the first end 30 of the seat cover material 28 may be alternatively be attached to the substantially horizontal surface of the stationary portion 16 and that the seat cover management system, i.e., spring roller 34, may be disposed on the adjustable portion 18 without exceeding the scope of the exemplary embodiment 36.

Figure 3A:
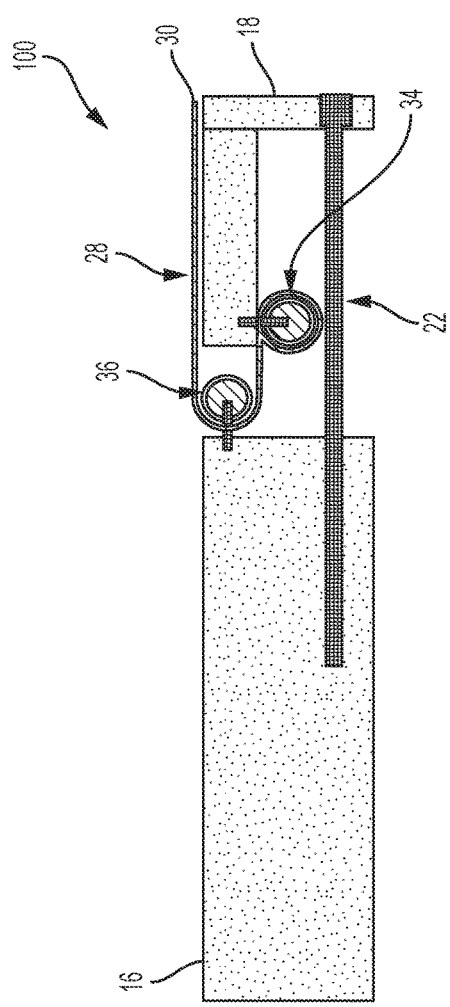
FIG. 3a is an illustration of a seat trim management system for seat cushion length adjustment in a retracted position in accordance with an alternative exemplary embodiment.
Figure 3B:
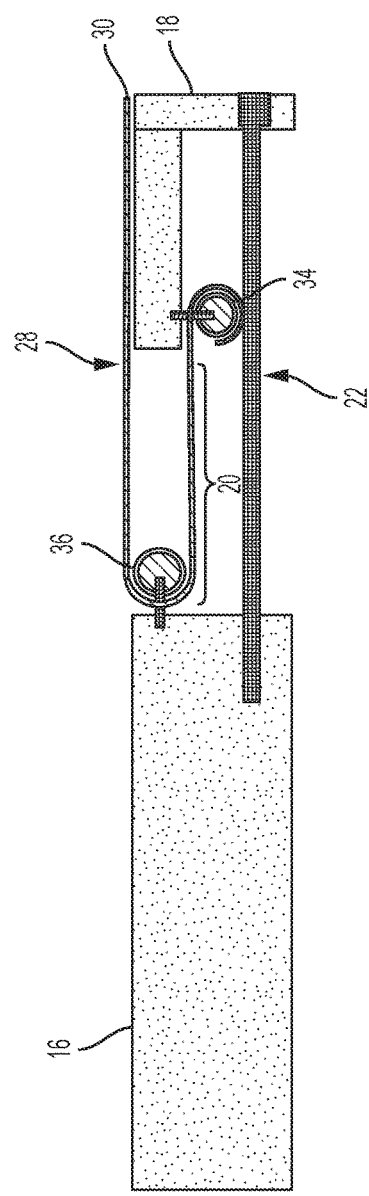
FIG. 3b is an illustration of a seat trim management system for seat cushion length adjustment in an extended position in accordance with the alternative exemplary embodiment.

Referring now to FIGS. 3a and 3b, an alternative embodiment 100 of a seat trim management system for seat cushion length adjustment is provided. In this embodiment the seat trim management system includes a spring roller 34 and a roller bar 36. In FIG. 3a, the seat trim management system 100 is in the retracted position, the first end 30 of the seat cover material 28 is attached to the substantially horizontal surface of the adjustable portion 18 and the material is passed over the roller bar 36 disposed on the stationary portion 16 such that the second end 32 of the seat cover material 28 can be attached to the spring roller 34 that is disposed on the adjustable portion 18. When in the retracted position, the seat cover material 28 in tightly coiled around the spring roller 34 such that the material will not become bundled and experience wrinkling or scuffing. When an occupant is seated on the stationary portion 16 and the foam of the seat cushion is compressed, the roller bar 36 is disposed on the stationary portion 16 such that it moves downward with seat cushion such that the occupant will not feel a ridge in the seat. The roller bar 36 may be attached to the cushion foam of the stationary portion 16 or attached to springs that have the same compression as the cushion foam.

FIG. 3b illustrates the alternative embodiment of the seat trim management system in an extended position. The adjustment mechanism 22 is used to manipulate the adjustable portion 18 from the retracted position to the extended position. During the adjustment of the adjustable portion 18 to the extended position, the seat cover material 28 uncoils from the spring roller 34 traverses over the roller bar 36 under constant tension such that the cover material 28 is elastically rigid while it shrouds the gap 20. In this embodiment, the first end 30 of the seat trim cover material 28 is attached to the substantially horizontal surface of the adjustable portion 18, the roller bar 36 is disposed on the stationary portion 16, and the spring roller 34 is disposed on the adjustable portion wherein the seat trim cover material 28 traverses the roller bar 36 when the adjustment mechanism is manipulated to move the adjustable portion 18 to the extended position. In another embodiment (not shown), the cover material 28 may be manipulated using sprockets fixed on the ends of the roller bar 36 together with corresponding perforations at the outside edges of the cover material 28. The roller bar 36 would be configured such that its rotation will be synchronized with the motion of the adjustable portion 18.

It is appreciated that the first end 30 of the seat trim cover material 28 may instead be attached to the substantially horizontal surface of the stationary portion 16, the roller bar 36 may be disposed on the adjustable portion 18, and the spring roller 34 may be disposed on the stationary portion 16 wherein the seat trim cover material 28 traverses the roller bar 36 when the adjustment mechanism is manipulated without exceeding the scope of the disclosed concept.

The description of the invention is merely exemplary in nature and variations that do not depart from the gist of the invention are intended to be within the scope of the invention. Such variations are not to be regarded as a departure from the spirit and scope of the invention.

What is claimed is:

1. A seat trim cover management system for seat cushion length adjustment comprising:
 a seat cushion base having a stationary portion and an adjustable portion wherein the stationary portion and the adjustable portion include a substantially horizontal top surface and a substantially vertical front surface;
 an adjustment mechanism in mechanical communication with the stationary portion and the adjustable portion configured to move the adjustable portion from a retracted position to an extended position relative to the stationary portion, wherein a gap is created between the stationary portion and the adjustable portion when at the extended position;
 a seat trim cover material having a first end fixed to the substantially horizontal top surface on the adjustable portion; and
 at least one seat trim cover management system comprising a spring roller attaching a second end of the seat trim cover material to the adjustable portion and configured to maintain tension between the first end and the second end of the seat trim cover material while the seat trim cover material shrouds the gap created between the stationary portion and the adjustable portion when at the extended position.

2. The system of claim 1 wherein the seat trim cover management system further comprises a roller bar.

3. The system of claim 2 wherein the seat trim cover material traverses the roller bar when the adjustment mechanism is manipulated.

4. The system of claim 2 wherein the roller bar is disposed on the stationary portion, and the seat trim cover material traverses the roller bar when the adjustment mechanism is manipulated.

5. A seat trim cover management system for seat cushion length adjustment comprising:
 a seat cushion base having a stationary portion and an adjustable portion wherein the stationary portion and the adjustable portion include a substantially horizontal top surface and a substantially vertical front surface;
 an adjustment mechanism in mechanical communication with the stationary portion and the adjustable portion configured to move the adjustable portion from a retracted position to an extended position relative to the stationary portion, wherein a gap is created between the stationary portion and the adjustable portion when at the extended position;
 a seat trim cover material having a first end fixed to the substantially horizontal top surface on the adjustable portion; and
 a spring roller attaching a second end of the seat trim cover material to the adjustable portion and configured to maintain tension between the first end and the second end of the seat trim cover material while the seat trim cover material shrouds the gap created between the stationary portion and the adjustable portion when at the extended position.

6. The system of claim 5 further comprising a roller bar.

7. The system of claim 6 wherein the seat trim cover material traverses the roller bar when the adjustment mechanism is manipulated.

8. The system of claim 6 wherein the roller bar is disposed on the stationary portion, and the seat trim cover material traverses the roller bar when the adjustment mechanism is manipulated.

9. A seat trim cover management system for seat cushion length adjustment comprising:
 a seat cushion base having a stationary portion and an adjustable portion wherein the stationary portion and the adjustable portion include a substantially horizontal top surface and a substantially vertical front surface;
 an adjustment mechanism in mechanical communication with the stationary portion and the adjustable portion configured to move the adjustable portion from a retracted position to an extended position relative to the stationary portion, wherein a gap is created between the stationary portion and the adjustable portion when at the extended position;
 a seat trim cover material having a first end fixed to the substantially horizontal top surface on the adjustable portion;
 a spring roller attaching a second end of the seat trim cover material to the adjustable portion and configured to maintain tension between the first end and the second end of the seat trim cover material while the seat trim cover material shrouds the gap created between the stationary portion and the adjustable portion when at the extended position; and
 a roller bar is disposed on the stationary portion, wherein the seat trim cover material traverses the roller bar when the adjustment mechanism is manipulated.

* * * * *